UNITED STATES PATENT OFFICE.

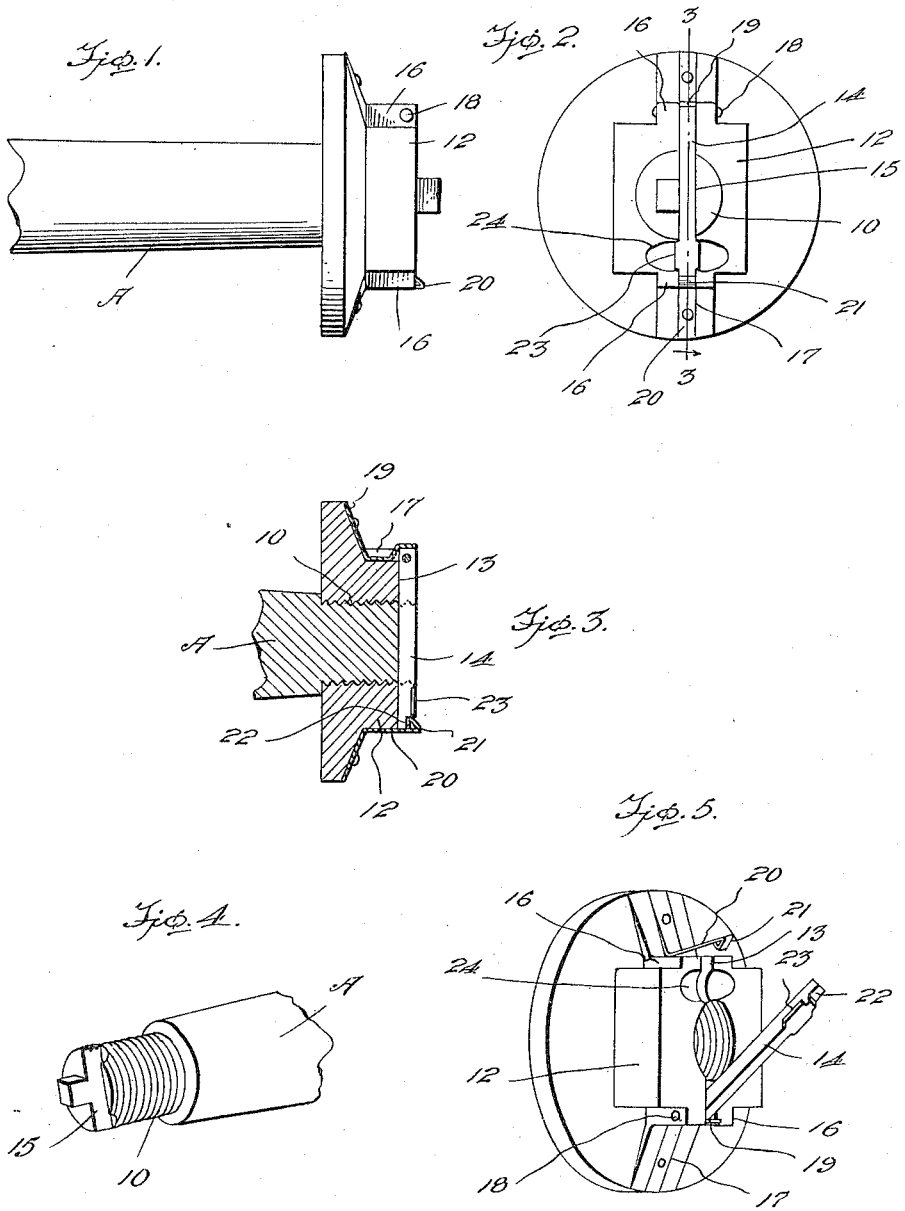

ALFRED I. LUSK AND LEE ZEIGER, OF MELBOURNE, IOWA.

NUT-LOCK.

1,228,331. Specification of Letters Patent. Patented May 29, 1917.

Application filed December 1, 1916. Serial No. 134,497.

*To all whom it may concern:*

Be it known that we, ALFRED I. LUSK and LEE ZEIGER, citizens of the United States, residing at Melbourne, in the county of Marshall and State of Iowa, have invented certain useful Improvements in Nut-Locks, of which the following is a specification, reference being had therein to the accompanying drawing.

The invention relates to nut locks, and more particularly to the class of vehicle nut locks.

The primary object of the invention is the provision of a nut lock of this character wherein the nut, when threaded on the axle spindle, will be securely fastened against working off of the same while the vehicle is in use, the lock being of novel construction so as to permit the securing of the nut upon the spindle with despatch.

Another object of the invention is the provision of a nut lock of this character wherein the lock is carried by the nut and forms a permanent part thereof and will securely fasten the nut in place upon the end of the axle spindle without possibility of the same working loose or coming off of the same, yet the nut can be readily removed when the occasion requires.

A further object of the invention is the provision of a nut lock of this character which is extremely simple in construction, thoroughly reliable and efficient in operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a fragmentary side elevation of an axle spindle showing the nut lock constructed in accordance with the invention applied;

Fig. 2 is a plan view of the nut lock applied to the axle spindle;

Fig. 3 is a sectional view on the line 3—3 of Fig. 2;

Fig. 4 is a fragmentary perspective view of the end of the axle spindle for receiving the nut;

Fig. 5 is a perspective view of the nut showing the lock open.

Similar reference characters indicate corresponding parts throughout the several views of the drawing.

Referring to the drawing in detail, A designates a portion of an axle spindle which is of the ordinary well known construction, having a reduced threaded outer end 10 on which is received the detachable nut 11, the details of which will be hereinafter fully described.

The nut 11 is formed on its outer face with a central raised boss 12 provided with wrench-engaging surfaces 13 so that a wrench or other like tool can be applied for the working of the nut 11 home upon the threaded end 10 of the spindle A, as usual, the nut being formed centrally with the usual threaded aperture for receiving the reduced threaded end 10 of said spindle, as shown.

Formed transversely in the outer face of the boss 12 on the nut 11 and intersecting the centrally threaded aperture is a groove forming a seat 13 for the lock, which comprises a latch bar 14, the reduced threaded end 10 of the spindle A being formed with a transverse groove 15 corresponding to the groove or seat 13, and is adapted to register therewith for receiving the bar 14 when in locking position. The boss 12 at diametrically opposite points of the threaded aperture is formed with ribs 16 which are provided with seats 17 and extending through both of these ribs 16 is the groove 13, while passed through one of the ribs 16 and also passed through one end of the bar 14 is a pivot 18 which swingingly connects the latch bar to the nut so that it may be moved to locking or unlocking position, as will be obvious.

In one of the seats 17, namely, the one next to the pivoted end of the bar 14, is mounted a leaf spring 19 which has its free end playing against the pivoted end of the bar so as to tension the same and automatically move it to locking position, while mounted in the other seat 17 is a resilient leaf-like keeper 20 which is formed with a free nib end 21 to engage in a notch 22 formed in the free end of the bar 14, and this keeper 20 is designed to maintain the bar 14 in locking position when engaged in the groove 15 in the reduced threaded end 10 of the spindle A so that the nut will be securely fastened thereon and will be prevented from working loose or coming off of the same.

The bar 14, near or at the free end thereof, is formed on opposite sides with lips 23 which are flush with the outer face of said bar and overhang finger depressions 24 formed in the outer face of the boss on one side of the threaded aperture at opposite sides of said bar so that the latter can be readily gripped by an operator for the swinging of the bar 14 to unlocking position when disengaged from the keeper 20, as will be clearly apparent.

From the foregoing description, taken in connection with the accompanying drawing, the construction and operation of the herein described nut lock will be readily apparent and, therefore, a more extended explanation has been omitted.

Having thus described our invention, we claim:

1. The combination with a spindle end, of a nut detachably mounted thereon and having a central outer boss, a locking bar pivotally mounted on the boss and counter-seated therein for engagement with the end of the spindle, means for tensioning the bar, a resilient keeper engaged with the bar when in locking position, the said boss being formed with finger receiving depressions, and lips on the bar overhanging said depressions.

2. The combination with a spindle end, of a nut detachably mounted thereon and having a central outer boss, a locking bar pivotally mounted on the boss and counter-seated therein for engagement with the end of the spindle, means for tensioning the bar, a resilient keeper engaged with the bar when in locking position, the said boss being formed with finger receiving depressions, lips on the bar overhanging said depressions, and ribs formed on opposite sides of the boss and forming seats for the resilient means and keeper.

In testimony whereof we affix our signatures.

ALFRED I. LUSK.
LEE ZEIGER.

Copies of this patent may be obtained for five cents each, by addressing the "Commissioner of Patents, Washington, D. C."